Sept. 1, 1942.  J. J. COOK  2,294,772
SNOW, ICE, AND MUD GRIPPING DEVICE FOR VEHICLE WHEELS
Filed Dec. 11, 1940  5 Sheets-Sheet 1

INVENTOR
John J. Cook
By Grover C. Hill,
ATTORNEY.

Sept. 1, 1942. J. J. COOK 2,294,772
SNOW, ICE, AND MUD GRIPPING DEVICE FOR VEHICLE WHEELS
Filed Dec. 11, 1940 5 Sheets-Sheet 2
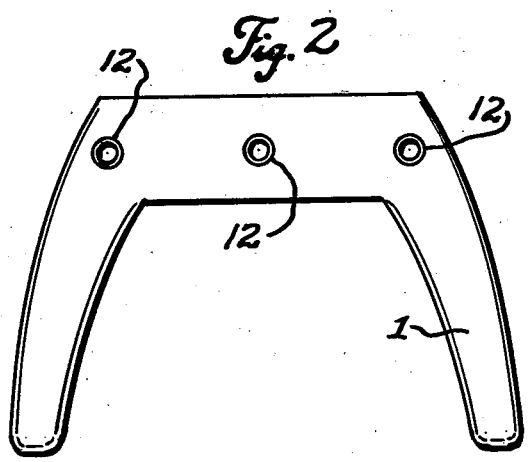
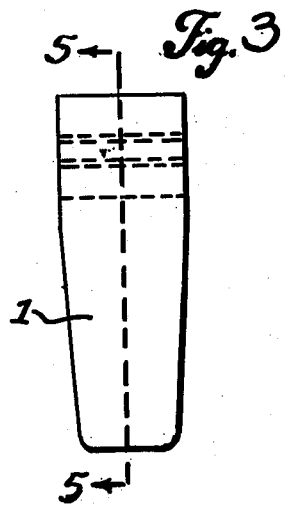
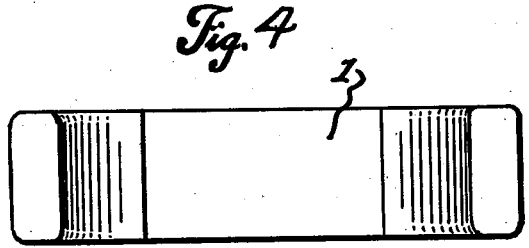
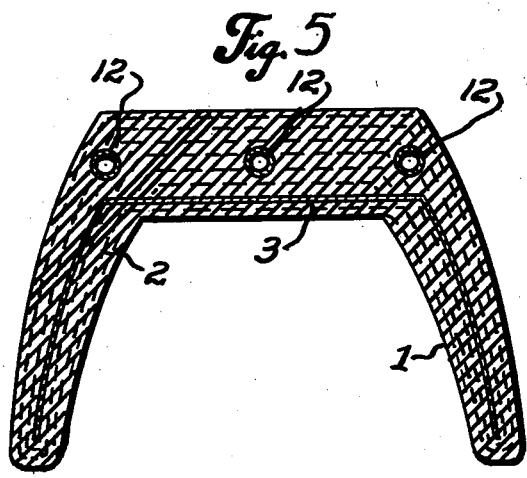
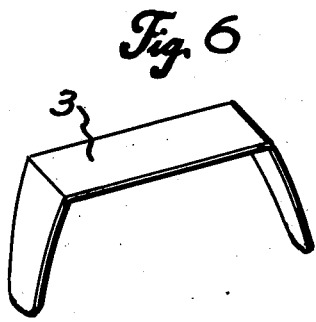
INVENTOR:
John J. Cook.
By Grover L. Hill,
ATTORNEY.

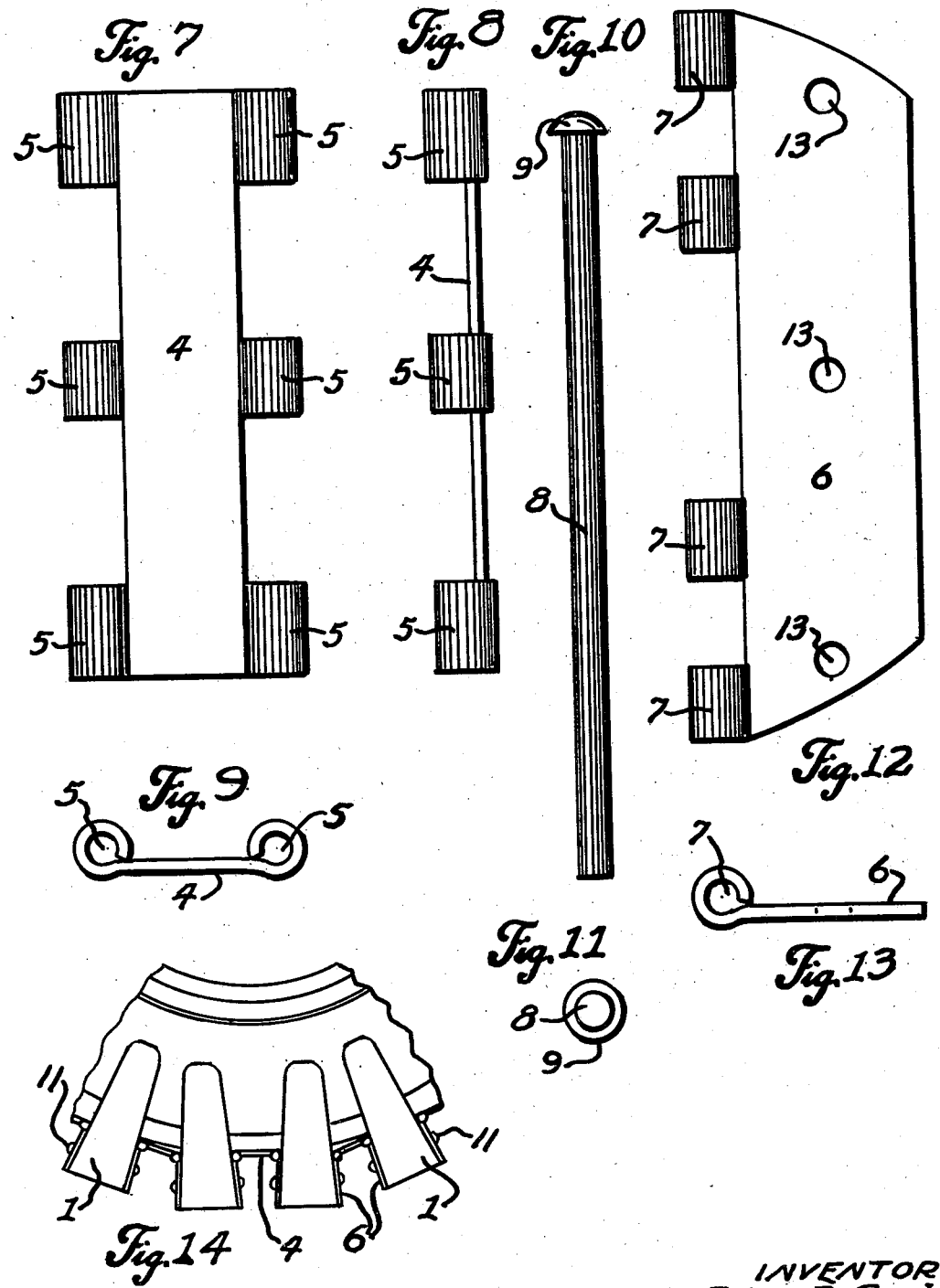

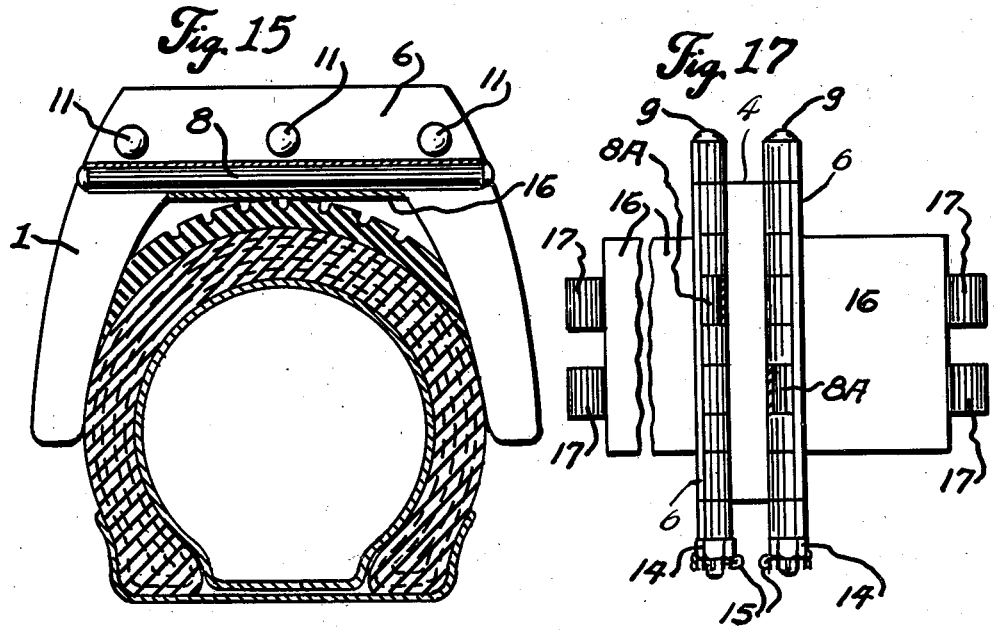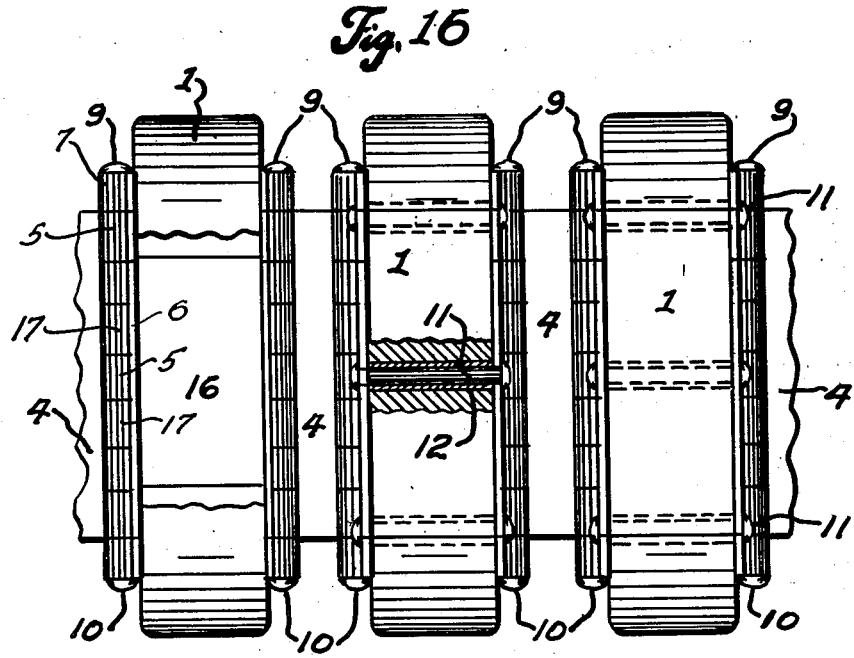

Sept. 1, 1942.   J. J. COOK   2,294,772
SNOW, ICE, AND MUD GRIPPING DEVICE FOR VEHICLE WHEELS
Filed Dec. 11, 1940   5 Sheets-Sheet 5
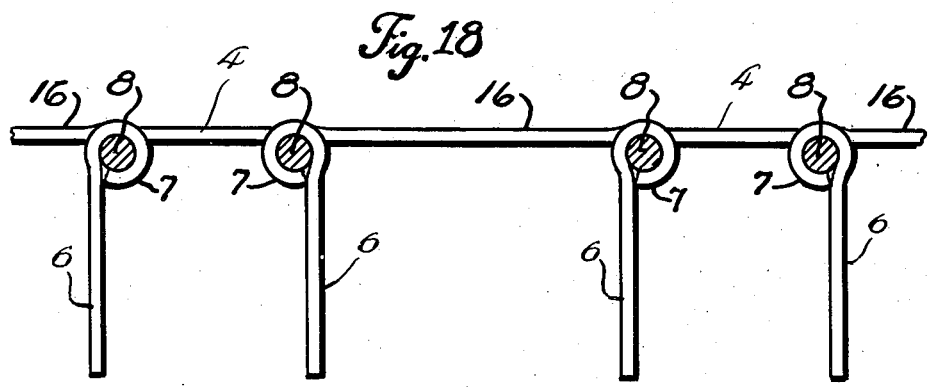
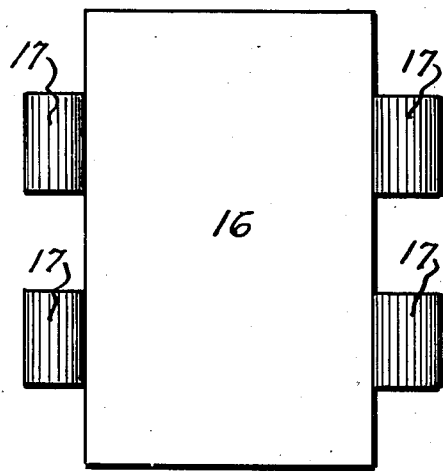
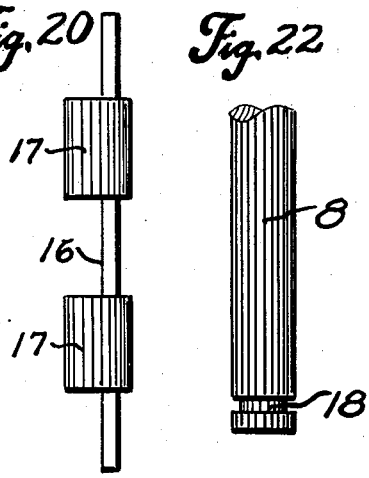
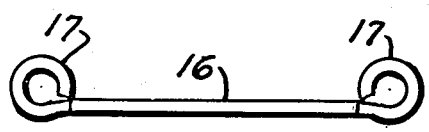
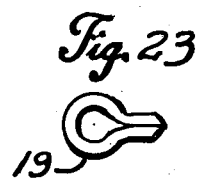
INVENTOR:
John J. Cook.
By Grover C. Hill,
ATTORNEY.

Patented Sept. 1, 1942

2,294,772

UNITED STATES PATENT OFFICE 2,294,772

SNOW, ICE, AND MUD GRIPPING DEVICE FOR VEHICLE WHEELS

John J. Cook, Detroit, Mich.

Application December 11, 1940, Serial No. 369,637

5 Claims. (Cl. 152—179)

In the extensive use of all types of rubber-tired vehicles, particularly the motor vehicle, the designers of rubber tires have provided treads for the tires that tend to extricate the vehicle from mud, and also to prevent skidding upon ice-covered surfaces, and which are purported to carry the vehicle through deep snow.

These treads have completely failed to accomplish the purpose and the result being that accidents from skidding and loss of control continue to mount as time proceeds.

A commonly known protection for this purpose are tire chains, grab hooks and the like. The use of chains or grab hooks causes uncomfortable riding, and injures the tires more or less with their use.

One of the objects of the present invention is to provide a device that is quickly and easily placed upon each of the rear wheels of the vehicle, and being composed of a plurality of rubber sections supported by as many steel hinge members so that the entire structure is yieldable in a manner so as to grip whatever surface encountered, namely snow, ice or mud.

While the device is designed primarily for passenger vehicles, it is as advantageous when applied to commercial vehicles, such as trucks, Army trucking vehicles, or in fact it may be successfully used for any type of truck or vehicle particularly adapted for heavy hauling.

With the foregoing in mind, it will become readily apparent that the invention possesses further advantages, all of which will be clearly revealed during the course of the following detailed description, illustrated throughout the accompanying drawings, and more fully pointed out in the appended claims.

With reference to the drawings:

Figure 2 is a side elevation of one of the U members; Figure 3 is an end elevation; and Figure 4 is a bottom view thereof.

Figure 5 is a vertical section of the U member taken upon line 5—5 of Figure 3.

Figure 6 is a reduced perspective view of the U member reinforcing spring skeleton.

Figure 7 is a front elevation of one of the hinge members; Figure 8 is a side elevation; and Figure 9 is an end elevation thereof.

Figure 10 is a side elevation of one of the hinge member connecting pins; and Figure 11 is an end elevation thereof.

Figure 12 is a front elevation of the remaining hinge member; and Figure 13 is an end elevation thereof.

Figure 14 is a partial elevation of the complete device, showing the action of the surface contacting U member sections.

Figure 15 is a transverse section super-enlarged and taken upon line 15—15 of Figure 1.

Figure 16 shows three sections of the device assembled and upon a flat horizontal plane.

Figure 17 shows one set of the hinge members assembled and ready to become a part of the device.

Figure 18 is an edge view of a series of complete hinge units in the position as they are assembled upon the device; the hinge pins being in section.

Figure 19 is a full size front elevation of one of the hinge link members; Figure 20 is a side elevation, and Figure 21 is an end elevation thereof.

Figure 22 is an enlarged view of a portion of one of the hinge pins in modified form.

Figure 23 is an elevation of the spring clip used with the pin indicated in Figure 22.

Figure 1:
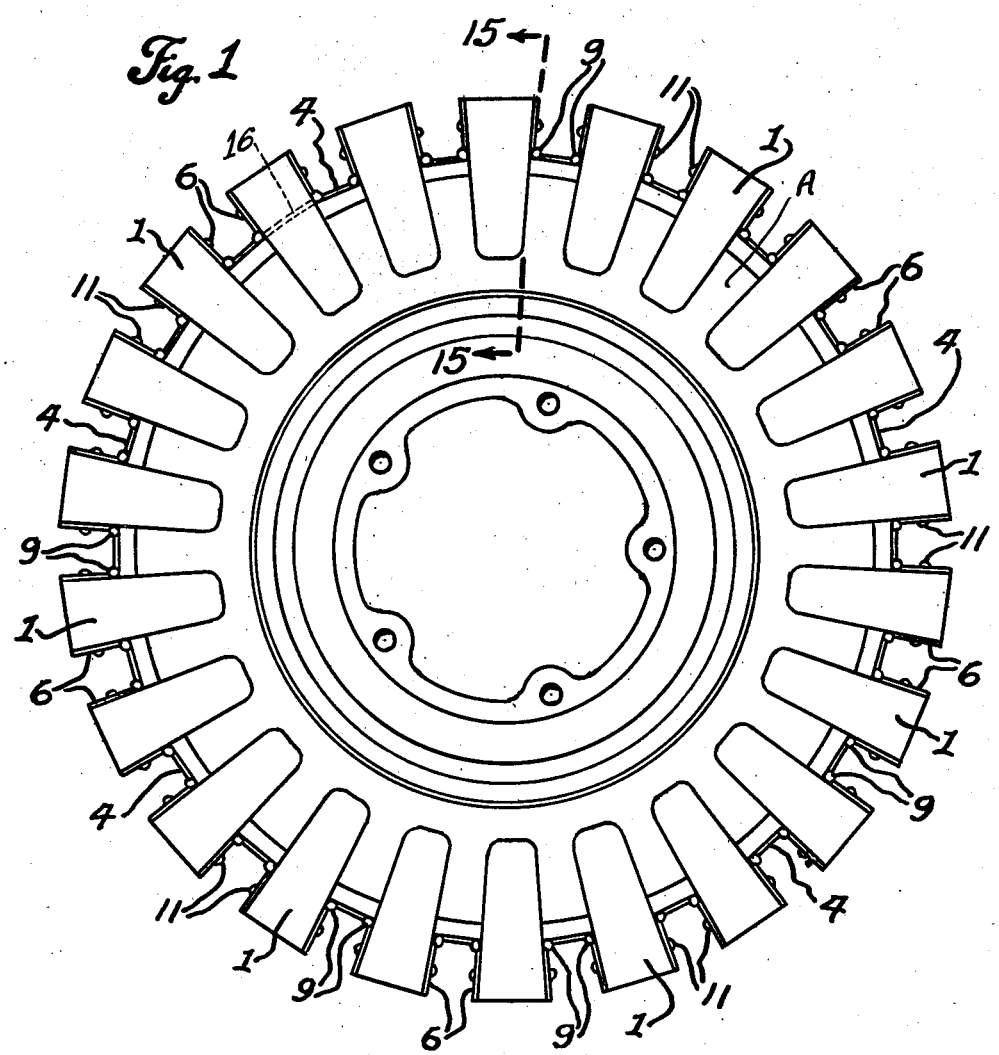
Figure 1 is a reduced elevation of the complete device normally mounted upon a vehicle wheel; the hub of the wheel being omitted.

In further carrying out the invention, the same comprises a plurality of radially disposed sections, each of said sections consisting of U member 1, which is composed of resilient rubber or similar material having fabric interwoven therethrough as at 2 and as clearly shown in Figure 5. U member 1 is also shown more particularly in Figures 2, 3 and 4. In Figures 5 and 6 it is also noted that spring steel skeleton 3 is provided and is embedded within U member 1 so as to adequately reinforce the same.

Referring more particularly to Figures 7, 8, 9, 10, 11, 12 and 13, it is seen that hinge member 4 is provided and has spaced apart sleeve portions 5 thereon where shown. Hinge member 6 is also provided and has spaced apart sleeve portions 7 as indicated, and it is understood that hinge members 6 interlock hinge members 4 by virtue of sleeve portions 5 and 7 as in Figures 17 and 18.

An important feature of the hinge members is that they are effectively tied together by virtue of hinge link member 16 having thereon spaced sleeve portions 17 adapted to interlock sleeve portions 5 and 7. The elements shown in Figures 17 and 18 constitute one complete hinge unit, said unit being connected by means of elongated pins 8 having head 9 and the opposite end of the pins are riveted to the hinge members as at 10 and as indicated in Figure 16.

The use of hinge link members 16 ties the entire structure together, prevents crawling of the device upon the tire without affecting the flexibility of the same, and really renders the device as a whole, indestructible.

Hinge members 6 are rigidly secured to U members 1 by rivets 11 through spacing sleeves 12, as in Figure 16. Sleeves 12 serve to keep hinge members 6 spaced at a fixed dimension at all times, and further to keep U members 1 properly shaped by preventing bulging of said members and the like.

Apertures 13 in hinge members 6 (Figure 12) are for the accommodation of rivets 11.

The device is installed upon the vehicle wheel with the use of removable pins 8A, which have their end threaded so as to receive castillated nuts 14, with cotter pins 15, as clearly shown in Figure 17. The remaining hinge member pins are provided as shown in Figure 10. Of course it is understood that as many of the type of pins as at 8A may be used as desired, although only two of said pins are shown in the drawings. Relative to installing or removing the device, a suitable clamp or the like may be used if preferred, however no form of such clamp is illustrated.

In Figure 1 it is clear that the device is suspended and is not in contact with any surface, whereas in Figure 14 a portion of the device is indicated showing the hinge action of the sections employed. In Figure 14 it is noted that two of the U members 1 will normally flatten out under certain load and contact the surface at all times.

In this manner the proper traction will always be effective in obtaining the proper results from the use of the device under all circumstances.

U members 1 may be composed of any suitable resilient rubber. They may be moulded as shown in the drawings, or they may be cut from automobile tires if preferred.

Hinge members 4 and 6 may be composed of steel stampings of the desired thickness of metal, or they may be forged or cast if preferred.

While a specific number of hinge member units are shown in Figure 1, a lesser or greater number of them may be used without affecting the general utility of the device.

This device is particularly adapted to trucks and other vehicles arranged for accommodating heavy loads, such as commercial vehicles and the like, however the same principle of the device may be used in reduced form so as to reduce the weight and proportions, thus being well adapted for passenger vehicles and which would possess all of the good qualities of the invention.

When a heavy laden truck mires down into mud, such as gummy clay, it is extremely difficult to extricate the truck from such position without the use of some device such as this one, and if the truck is extricated from this condition it usually requires much time to accomplish this purpose, and the saving of time is one of vital importance to commercial transportation and particularly the transportation of military and naval supplies and equipment.

On the other hand Army trucks must ply through deep snow and over ice-covered surfaces, in fact they must be equipped to encounter any and all types of roads and passways, whether improved or unimproved, and it is needless to state that the device will serve equally as well for commercial vehicles.

In Figures 22 and 23, a modified form of hinge pin 8 is shown, said pin being provided with circumferential groove 18, which is adapted to detachably receive spring clip 19. In this manner any one of pins 8 may be removed by first removing clip 19. The use of the modified form of pins 8 and clips 19 would eliminate any difficulty in removing said pins in the event of rust or the like.

Through the standardizing of manufacture this device may be produced at a minimum cost, thus permitting the same to be sold upon the market at a correspondingly low price and within the reach of all classes.

The device is so sturdily constructed that with ordinary care it should serve for the purpose for an indefinite period, the wear even from continual use being exceedingly small.

While I have shown the preferred embodiment of my invention, it is to be understood that various changes in the size, shape and arrangement of parts may be resorted to without departing from the spirit of the invention and the scope of the appended claims.

Having thus fully described my invention, what I claim as new is:

1. In a device of the class defined, a series of radially disposed sections assembled together and being as a whole adapted to conform to the outer circumference of a vehicle tire, each of said sections comprising a U member, also a set of hinge members consisting of a central member and a member upon each side thereof, also a hinge link member, means for pivotally connecting all of said hinge members together and thereby connecting all hinge sets in an endless formation, means for connecting the hinge sets to the respective U members aforesaid, means for installing and removing the device with respect to aforesaid vehicle tire, and further means for independently reinforcing said U members.

2. In a snow, ice and mud gripping device for vehicle wheels, a series of equally spaced and radially disposed hinge sections, each of said sections embodying a U member, a central hinge member and a pair of side hinge members, said central member having a series of spaced sleeve portions upon each side thereof and being integral therewith, said side hinge members having a series of spaced sleeve portions, also a hinge link member with spaced sleeve portions upon each side thereof, the sleeve portions of all hinge members named engaging each other, a pin extending through all sleeve portions thereby interlocking the members to each other and in an endless formation, said side hinge members being secured to aforesaid U members and upon the respective sides of the U members, by a series of laterally extending rivets, a tube for each of said rivets, said tubes being of a length so as to keep said U members properly shaped at all times, and a spring steel skeleton embedded within each of said U members for reinforcing the same.

3. In a device of the character described, a plurality of spaced U-shaped sections arranged radially around a tire, hinge means interconnecting the sections, including a base plate arranged between each pair of sections and a pair of side plates hingedly connected to the sides of the respective base plates, said side plates abutting the sides of the adjacent U-shaped sections and being connected thereto.

4. In a device of the character described, a plurality of spaced U-shaped ground engaging sections arranged around a tire, hinge means interconnecting the sections, including a base plate arranged between each pair of sections and adapted to be disposed against the tread portion of the tire, a pair of side plates hingedly connected to the sides of each base plate and connected to the side faces of the respective U-shaped sections, and additional plates interposed between the crown portions of the U-shaped sections and the tread portion of the tire, said last mentioned plates being hingedly connected to the sides of the respective base plates.

5. In a device of the character described, a plurality of spaced U-shaped rubber sections extending around a tire, metallic sleeves extending through the crown portion of each U-shaped section, transversely thereof, hinge means interconnecting the sections, including a base plate arranged between each adjacent pair of sections and adapted to be disposed against the tread portion of the tire, a pair of side plates hingedly connected to each base plate at the respective sides thereof, said side plates extending outwardly against the side faces of the adjacent U-shaped sections and formed with openings adapted to register with the respective metallic sleeves in the crown portion of said sections, and fastening elements extending through the metallic sleeves and the openings in the complementary pairs of side plates associated with each U-shaped section.

JOHN J. COOK.